March 8, 1966     S. JANUS     3,238,900
BALANCING MECHANISMS FOR FURNITURE
Filed May 15, 1964     4 Sheets-Sheet 1
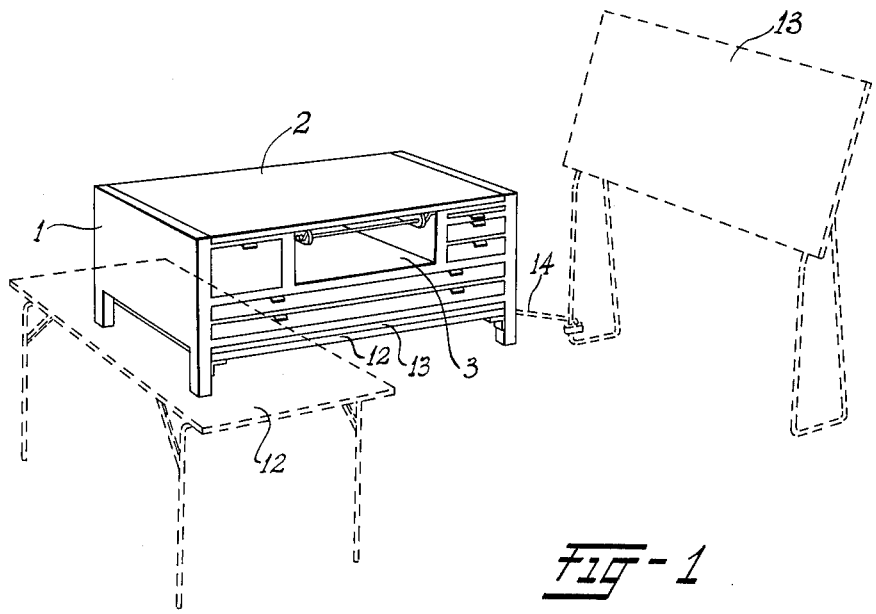
Fig-1
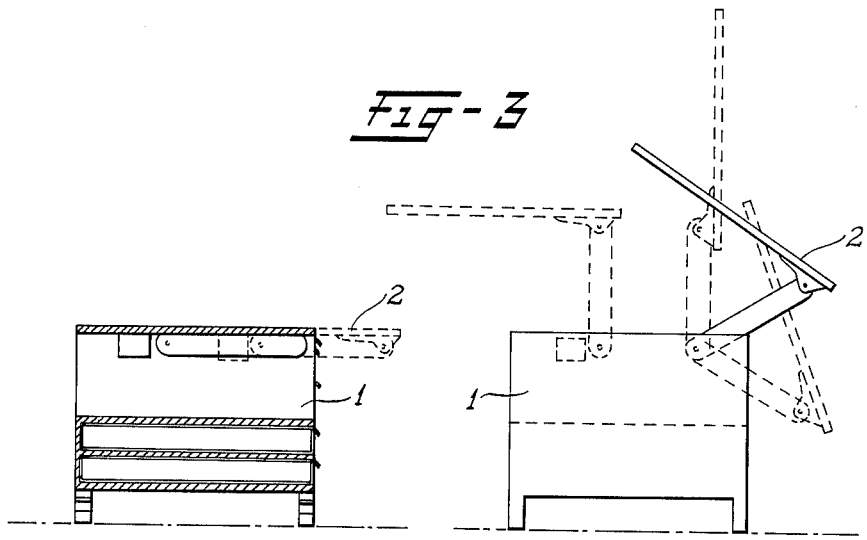
Fig-3
Fig-2
INVENTOR.
Stanley Janus March 8, 1966  S. JANUS  3,238,900
BALANCING MECHANISMS FOR FURNITURE
Filed May 15, 1964  4 Sheets-Sheet 2
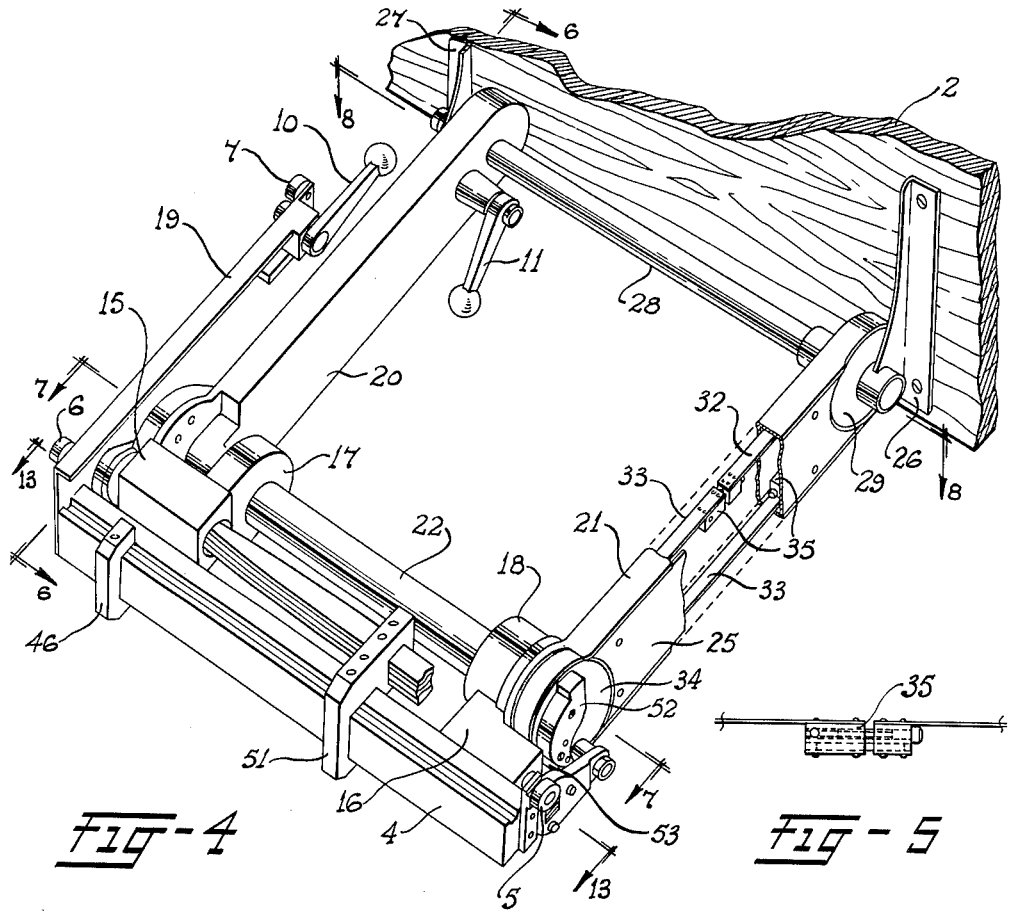
*Fig-4*  *Fig-5*
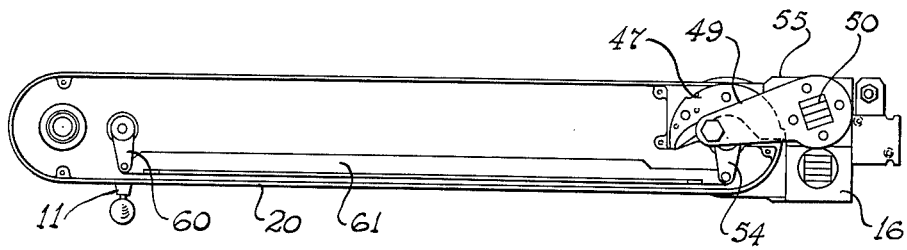
*Fig-6*
INVENTOR.
Stanley Janus
BY
his atty March 8, 1966  S. JANUS  3,238,900
BALANCING MECHANISMS FOR FURNITURE
Filed May 15, 1964  4 Sheets-Sheet 3
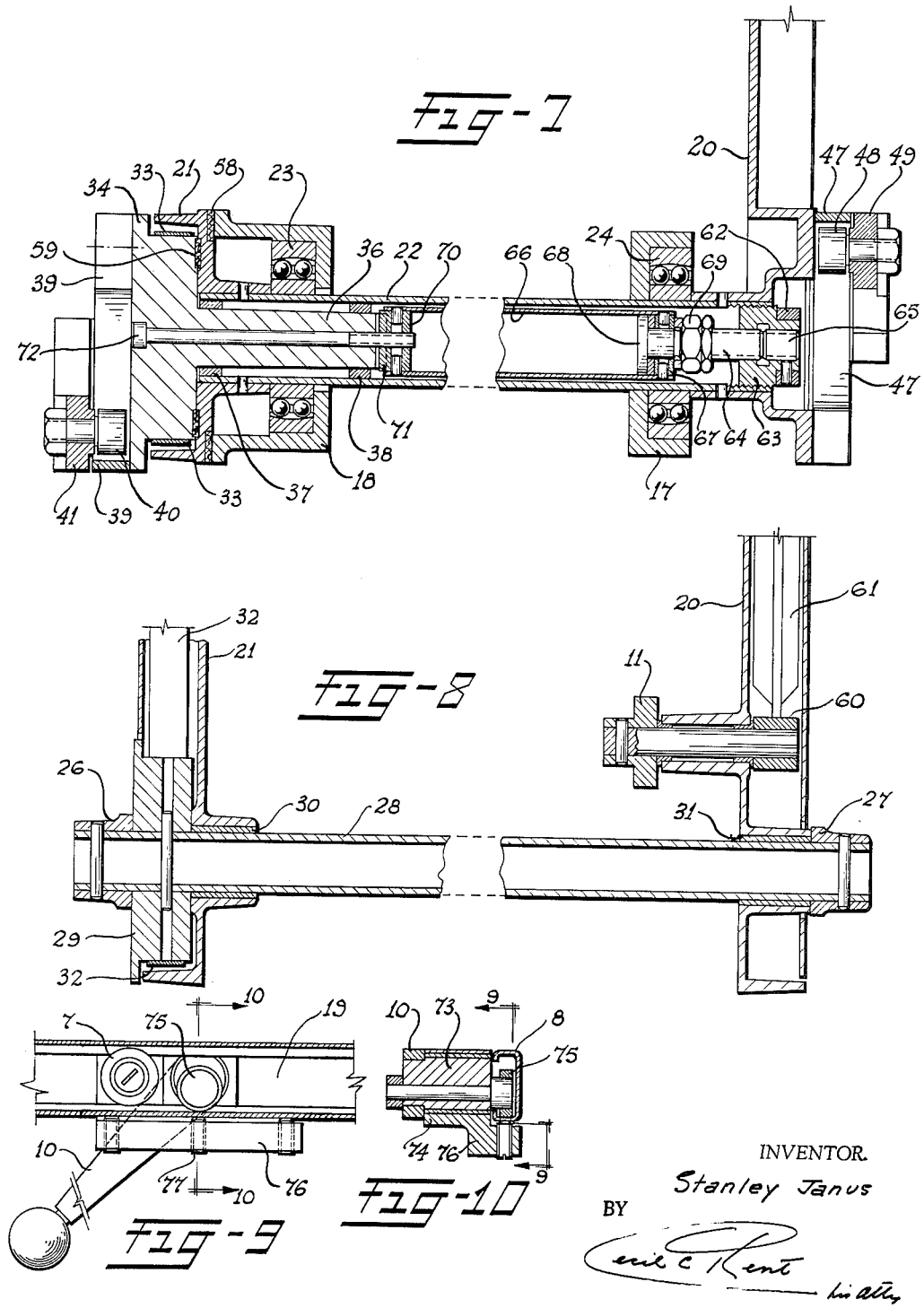
INVENTOR.
Stanley Janus
BY
his atty March 8, 1966 S. JANUS 3,238,900
BALANCING MECHANISMS FOR FURNITURE
Filed May 15, 1964 4 Sheets-Sheet 4
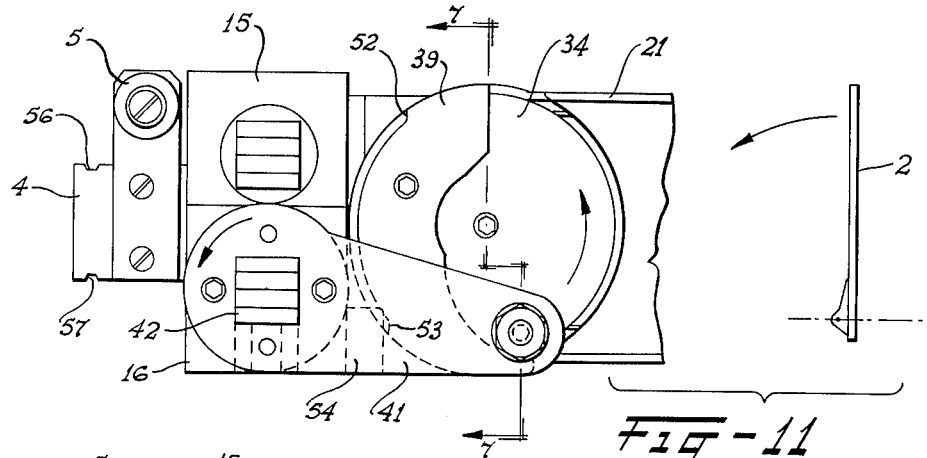
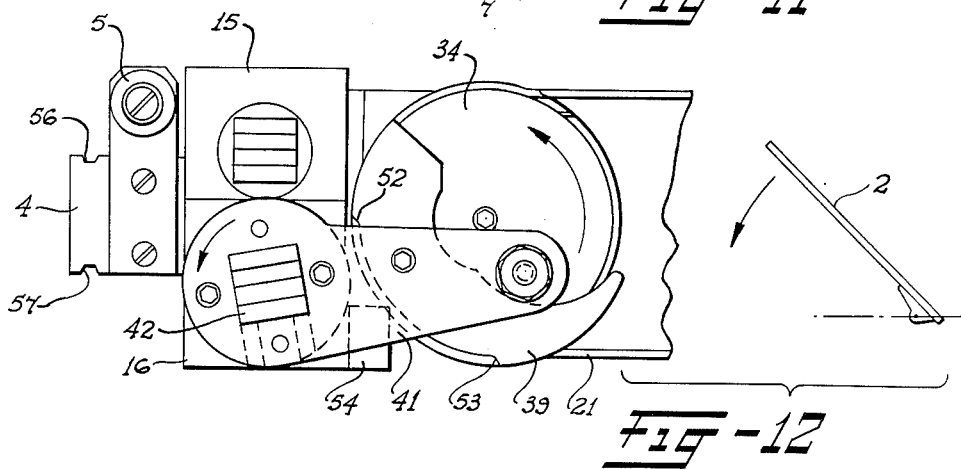
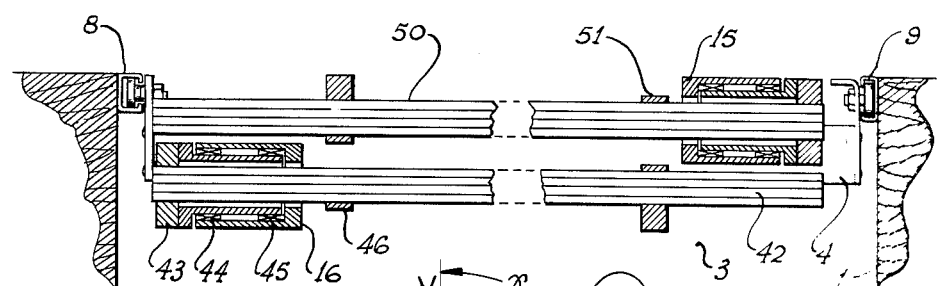
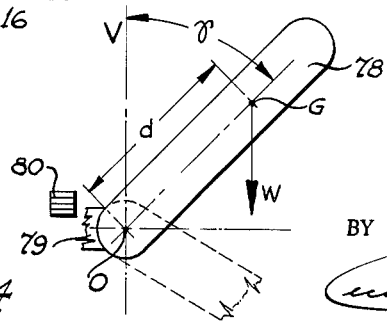
INVENTOR.
Stanley Janus
BY
Cecil C. Kent
his atty United States Patent Office 3,238,900
Patented Mar. 8, 1966

3,238,900
BALANCING MECHANISMS FOR FURNITURE
Stanley Janus, 1 Browning Ave., Toronto,
Ontario, Canada
Filed May 15, 1964, Ser. No. 367,794
9 Claims. (Cl. 108—2)

The present invention relates to a balancing mechanism which in its basic form serves the general purpose of exactly balancing a body rotatable about an axis by means of spring associated with a cam, said basic form of the mechanism being susceptible to a great variety of possible uses, such as balancing small machine parts, doors, booms of large cranes and the like.

As herein exemplified however, the invention is illustrated and described in relation to the balancing of a drafting board, including means for locking the board in any set position, together with a means and manner of combination of the components of said balancing mechanism with a desk so as to form a single unit, the invention (again as herein exemplified) also including improvements in the said desk itself.

A main object of the invention, both in principle, and as herein exemplified, is to provide means for the exact balancing, with a spring, of an axially pivoted body with one degree of freedom; said degree of freedom being its angle of rotation about said axis, and to apply the invented means to the balancing of a drafting board in two degrees of freedom, that is to say, as to its height, and as to its angle of inclination or tilt. The present methods of employing springs for balancing a drafting board, provide approximate, but not exact means for the balancing of the drafting board in any position, such as is for instances possible with drafting boards which are balanced by weights. The discrepancies between approximate balancing by springs and exact balancing, become quite pronounced when the range of variability as to positions of the board is of large magnitude such as between 0 and 90 degrees in the angle of inclination of the board.

Because weights of objects attached to drafting boards (such as drafting machines) are either not known in advance, or are changed during the use of the board, a further object of the present invention is to provide simple means for adjusting the present mechanism for various weights in such a way as to maintain, after re-adjustment, the same exact balance, and this within a wide range of positions of the drafting board.

A further object of the present invention is to provide means for locking the board at any height within predetermined limits, and at any angle of inclination between predetermined limits, and this by means of a single hand control lever conveniently located.

A further object of the present invention is to provide means and a manner of combining the herein described balancing mechanism with a desk in such a way that the drafting board may either be moved into a horizontal plane to function as the top of the desk, or to be moved into such offset positions relative to said desk (and at various heights and angles of inclination) such that substantial leg room permitted for the draftsman beneath the board when he is sitting.

A still further object is to provide an easily erected, and large display area for reference drawings which can be conveniently viewed by the draftsman without the need for turning bodily around or walking away from the drafting board.

With the foregoing objects in view, and such other objects as may become apparent as this specification proceeds, the present invention consists in the following arrangement and construction of parts, all as hereinafter more particularly described, reference being had to the accompanying figures in which:

FIGURE 1 is a general perspective representation of the present invention wherein the drafting board is shown in horizontal position and perfectly overlying the associated desk, and includes a phantom representation of the associated reference board and easel, together with another reference table on the left-hand side of the foregoing.

FIGURE 2 is a cross-sectional transverse elevation of the desk associated with the present balancing mechanism (also shown) wherein the drawing board is shown as horizontal, but partially offset from the desk so as to provide leg room for a sitting draftsman as already indicated.

FIGURE 3 is an end elevation of the desk forming part of the present invention, depicting, in phantom lines, and schematically, the balancing mechanism supporting a drafting board at various heights and angles of inclination.

FIGURE 4 is a perspective representation of the balancing mechanism constituting the present invention.

FIGURE 5 is a detail indicating the manner in which the belt or strap forming part of the tilt balancing mechanism may be united at the ends thereof for adjustable tightening.

FIGURE 6 is a sectional representation substantially upon the line 6—6 of FIGURE 4.

FIGURE 7 is a section substantially upon the line 7—7 of FIGURE 4, except that the right hand side of the section shows the mechanism with arms raised vertically.

FIGURE 8 is a section substantially upon the line 8—8 of FIGURE 4.

FIGURE 9 is a detail illustrating the means by which the base structure of balancing mechanism of FIGURE 4 may be clamped to the track in the upper part of the desk.

FIGURE 10 is a detail of the cross-section upon the line 10—10 of FIGURE 9 substantially at right angles thereto.

FIGURE 11 is an end view of the spring means, lever, and cam arrangements forming part of the means which govern the balancing of the angle of inclination of the associated drawing board, and wherein the said drawing board is shown in vertical position.

FIGURE 12 is a view similar to FIGURE 11 but depicting the position of the lever and cam when the drawing board is inclined at approximately 45 degrees from the vertical.

FIGURE 13 is a section substantially on the line 13—13 of FIGURE 4.

FIGURE 14 is a schematic representation of the rotatable body for reference in connection with the theoretical exposition of principles employed in the balancing mechanism.

In the drawings, the characters of reference designate similar parts in the several figures.

In the combination of the present balancing mechanism with desk 1, drawing board 2 may be brought into such position as to form the top of the desk as shown in the accompanying FIGURE 1. The said balancing mechanism fits inside a well 3 formed in the upper part of the desk. This well extends clear across the desk and is open on both sides thereof. The balancing mechanism shown most comprehensively in the accompanying FIGURE 4, together with the drawing board and springs (to be described in greater detail hereinafter) is a self-contained unit which can readily be removed from the desk if desired.

The base structure of the present balancing mechanism, part of which is comprised of main member 4, has rollers 5, 6 and 7 upon the sides thereof. These roll in two parallel and horizontal tracks 8 and 9 best depicted in the accompanying FIGURE 13 and attached to the desk along the top edges of the aforesaid well. Roller 5 rides in track 8, and rollers 6 and 7 in track 9. Supporting the balancing mechanism on three points only in this way has a number of advantages. One of these resides in the fact that three rollers will not jam in the pair of tracks if the latter are not perfectly parallel as easily as four rollers would do. By means of the rollers and track arrangements just described, it will be readily apparent that board 2 can be moved horizontally to one side of the desk for the convenience of a sitting draftsman as best depicted in the accompanying FIGURE 2. The balancing mechanism can be locked to the desk 1 in any position by pushing down handle 10. With the balancing mechanism occupying the position indicated in the left-hand portion of the accompanying FIGURE 3, the board can be raised and tilted between various angles of inclination. If however the balancing mechanism is pulled out as shown on the right-hand side of the said FIGURE 3, the board can also be lowered so that part of its lies beneath the horizontal plane of the desk top. The board may be locked at any height and angle of inclination by rotation of handle 11.

Two reference boards 12 and 13 which are of the same dimensions as board 2, and are provided with collapsible, detachable or folding legs constituting an easel, are shown stored in the lower part of desk 1 in the accompanying FIGURE 1. Two different types of reference board can be used, that designated 12 functioning as an ordinary table, and that designated 13 being intended for use in a sub-vertical position. To render board 13 more stable in use, a link 14 may be employed to connect same to a fitting (not shown) in desk 1.

The balancing mechanism most comprehensively illustrated in the accompanying FIGURE 4 will now be described in detail, the same comprising three major sub-assemblies, that is to say, a base structure, an arm structure, and a board structure.

The base structure is comprised of main member 4, two torsion bar bearing housings 15 and 16, two main-shaft bearing housings 17 and 18, and an extension rail 19. Parts 4, 15, 16, 17, 18 and 19 are all either parts of the same casting or are bolted rigidly together.

The arm structure consists of two arms 20 and 21 pinned to a main shaft 22 designed to rotate freely in bearings 23 and 24 mounted in the aforementioned base structure. Arms 20 and 21 are both of U-shaped cross-section and both are provided with elongated cover-plates to close the open side of the elongated cavity in the said arms 20 and 21 thereby to conceal the components therein.

The centre line of main shaft 22 will hereinafter be considered as the first axis. Upon it the aforesaid arm structure may rotate in the aforesaid base structure. Specifically arms 20 and 21 may be rotated to any position between the vertical (above the shaft 22) and 30 degrees below the horizontal axial plane of the said shaft as will clearly be apparent by inspection of the right-hand side of the accompanying FIGURE 3.

The board structure comprises the board 2 itself, a pair of hinge-brackets 26 and 27, a board shaft 28, and board pulley 29. Parts 2, 26, 27, 28 and 29 are either screwed together or pinned to each other so as to form one rigid structure as best illustrated in the accompanying FIGURE 8. From this figure it will also be observed that shaft 28 rotates in bushings 30 and 31 provided in arms 20 and 21.

The centre line of board shaft 21 is herein considered as the second axis. Thus, the board structure is pivoted on said second axis to the said arm structure. The board can be rotated on the second axis to any position between vertical and horizontal.

Broad pulley 29 is connected by a pair of steel bands 32 and 33 to another pulley 34 of the same diameter, rotatably attached to the end of main shaft 22. The aforesaid bands are anchored to points on the perimeters of both pulleys. A tensioning device 35 is provided for tensioning each of the aforesaid bands as will be observed by reference to the accompanying FIGURE 4, and for adjustment of the relative positions of pulleys 29 and 34. Obviously the aforesaid bands or straps 32 and 33 may be replaced by chain or equivalent transmission means provided backlash is eliminated. Pulley 34 is provided with an integral tubular extension 36 freely rotatable on the needle bearings 37 and 38 within main shaft 22 as best depicted in the accompanying FIGURE 7.

If the arm structure is held stationary, and board 2 is rotated on the aforesaid second axis by angle $\gamma$, pulleys 29 and 34 are rotated by the same angle. If however board 2 is held at a constant angle of inclination with respect to its horizontal position while arms 20 and 21 are rotated vertically on the said first axis, the pulley 29 will not rotate. Because of this elementary geometrical fact, pulley 34 is hereafter referred to as a "board follower." By means of it, board 2 may be balanced for rotation about the said second axis independently of rotation of the aforesaid arm structure on the said first axis. Balancing of the arm structure together with the board structure hinged to it at its distal end for rotation about the first axis is effected separately and independently from rotation of the board about the said second axis. Balancing of the board 2 for its angle of inclination is accomplished by a torsion bar which acts on board follower 34 in the manner best illustrated in the accompanying FIGURES 11 and 12. From these figures it will be seen that a balancing cam 39 is bolted to board follower 34 while a roller 40 attached to the end of torque lever 41 engages the working face of the said cam. This torque lever is clamped to the free end of the laminated torsion bar 42. It is also bolted to the flange of sleeve 43 (see FIGURE 13) which may be rotated in base structure 16 on needle bearings 44 and 45. By this means lateral support is provided for the said torsion bar 42. Clamp 46 anchors it to the main member 4 of the base structure as best illustrated in the accompanying FIGURE 4.

When the board 2 is tilted in the direction depicted in the accompanying FIGURES 11 and 12, board follower 34, with cam 39 are caused to rotate and in doing so act upon torque lever 41 to twist torsion bar 42 which resists further rotation of the board under the influence of gravity. Inclining the board from vertical to horizontal twists the end of torsion bar 42 by only 20 degrees. The length of torsion bar 42 is so selected that its characteristic remains practically linear within the limits of its maximum distortion or twist.

Balancing of the arm structure, together with the board structure hinged to it, for rotation about the aforesaid first axis is effected by cam 47, roller 48, torque lever 49, and torsion bar 50—that is to say, in exactly the same manner as balancing of the board for inclination as already explained, except that in this case cam 47 is bolted directly to arm 20. Torsion bar 50 is anchored to the base structure by clamp 51. Torsion bars 42 and 50 are equally spaced from the said first axis to make possible the use of balancing cams 39 and 47 and torque levers 41 and 49 which are of identical design. Shoulder portions 52 and 53 on both cams limit the movement of the associated board and rotation of the associated arms in cooperation with the abutments 54 and 55 on the base structure 15 and 16.

When arms 20 and 21 are elevated into the vertical (and the centre of gravity of the arm structure is in the position of maximum altitude) torsion bar 50 is untwisted. The twisting of the same commences when the aforesaid arms are moved downwardly from the just stated position. Likewise, torsion bar 42 is untwisted when the centre of gravity of the board structure is in the condition just stated. The curvature of the working surfaces of cams 39 and 40 is so calculated that exact balancing obtains at any angle of inclination and at any altitude of the board 2. The adjustment for different weights of board to be balanced is effected by moving the clamps 46 and 57 (best shown in the accompanying FIGURE 4) along the main member 4, and are hooked into grooves 56 and 57 (FIGURES 11 and 12) to resist torque. It would also be apparent that they may be moved past the bearing housings 15 and 16 so that the full length of both torsion bars may be utilized.

To lock the board 2 in any set position, handle 11 is rotated to exert tension on board follower 34 via connecting rod 53. Such tensioning toward bearing housing 18 clamps both board follower 34 and the hub of arm 21 to bearing housing 18 which latter is a part of the base structure. This has the effect of locking both board 2 and arms 20 and 21 to the base structure. Brake linings 58 and 59 increase friction and effectiveness of such locking action.

Rotation of handle 11 in one direction causes board follower 34 to be pulled, and hence lock it, and in the opposite direction to be pushed and hence to unlock it. This is effected by means of the linkage partly contained within arm 20 (see FIGURE 6) and partly within main shaft 22 (see FIGURE 7). Rotation of handle 11 through crank 60, the aforesaid connecting rod 61, and crank 62 causes rotation of plug 63 which is pinned to crank 62. The plug is externally threaded to engage an internal mating thread formed in shaft 22. This effects longitudinal axial movement of belt 64 locked to the aforesaid plug 63. Bolt 64 has a left-hand thread and is screwed into the central aperture of plug 63. Bolt 64 is locked to plug 63 by means of the set-screw 65 which has a right-hand thread. By removing this set-screw, and by rotating bolt 64 relative to plug 63, it is possible to adjust the end-limit positions of handle 11 and so compensate for wear in the friction-linings 58 and 59.

When locked to plug 63, bolt 64 rotates and moves endwise together with plug 63, but only the latter movement is transmitted to sleeve 66. This is due to the fact that ring 67 within sleeve 66 is fastened to the latter. The said ring (provided with a thrust washer upon either side of it) is positioned between the head 68 of bolt 64, and the nuts 69 screwed on to the bolt 64. These nuts are so adjusted and locked that bolt 64 can turn freely within ring 67 while moving endwise together with sleeve 66. A plug 70 is pinned within the opposite end of sleeve 66. This plug is keyed at 71 to shank 36 of board follower 34 to prevent relative rotation of these two elements so that bolt 72 which holds them together cannot become unscrewed.

To lock the said base structure to desk 1, another brake is provided to be operated by handle 10 depicted in the accompanying FIGURE 4. This handle, as shown in the accompanying FIGURES 9 and 10 is mounted on the end of stub-shaft 73 and rotates freely in housing 74 integral with rail 19 which is to be considered as part of the base structure. A roller 75 is mounted eccentrically on stub-shaft 73 so that when the handle 10 is rotated, roller 75 is forced against the interior base surface of track 8 thereby lifting slightly the whole track 19 with roller 7 attached to it since the interior dimensions of the track 8 permit this. As a result foot 76 which is integral with housing 74 and rail 19 is also raised thus forcing the adjusting screws 77 against the underside of track 8. This in turn locks the said base structure to the rail 8 and hence to desk 1.

*Construction of the balancing cam*

To be able to understand better how a cam for exact balancing is constructed for use in the described balancing mechanism it is necessary to consider first a basic case which is that of balancing a rigid body 78 (FIGURE 14) rotating with respect to fixed body 79 on axis going through point O under right angle to the plane of drawing. In this basic case balancing taking place by means of torsion bar 80, torque lever and cam (not shown on FIGURE 14) mounted relative to bodies 78 and 79 in the same manner as they are mounted relative to arm 20 and base structure respectively. Centre of gravity of body 78 is denoted by O, its weight by W and the distance of the centre of gravity G from the axis of rotation O—by $d$. When point G is on vertical line OV, torsion bar 80 is relaxed. When the body 78 is turned clockwise by angle $\gamma$, the end of torsion bar is twisted by angle $\omega$. When body 78 is turned by angle $\gamma$, its centre of gravity G is lowered, in other words, potential gravitational energy of body 78 is reduced by an amount which we shall denote $E_g$. It is well known that $$E_g = Wd(1 - \cos \gamma) \quad (1)$$

The energy $E_t$ of elastic deformation of torsion bar 80, when its end is twisted by angle $\omega$ can be expressed as $$E_t = \int_0^\omega T(k, l, \omega) \, d\omega, \; \omega \text{ in radians} \quad (2)$$

wherein $T(k, l, \omega)$ is the characteristic of torsion bar 80 and $k, l$ are constants determined by its "stiffness." When torsion bar has a linear characteristic, that is torque T produced by the bar is proportional to its angle of twist $\omega$, then $$E_t = \frac{k}{l}\omega^2, \; \cdots \; \omega \text{ in radians} \quad (3)$$

where $k$ is a constant depending on cross-section and material of the torque bar and $l$ is working length of the bar. If exact balancing of body 78 is to be obtained, a relation must hold $$E_g = E_t \text{ for every } \gamma \text{ with variation range} \quad (4)$$

In the balancing mechanism described, torsion bars of approximately linear characteristics are used in which case from (4), (1) and (3) it follows that $$Wd(1 - \cos \gamma) = \frac{k}{l}\omega^2,$$

$$1 - \cos \gamma = \frac{k}{Wdl}\omega^2 \quad (5)$$

Eq. 5 establishes relationship between $\gamma$ and $\omega$ if exact balancing of body 78 is to take place. This relationship is non-linear and cannot be produced by coupling body 78 to torsion bar 80 by means of sprockets and chain or similar transmission means all of which produce linear relationship between $\gamma$ and $\omega$. It is known that by using such simple transmission means approximate balancing can be obtained in the region $0 < \gamma < 30°$ but for $\gamma$ larger than 30°, discrepancy increases to achieve over 50% of weight to be balanced and even more for $\gamma > 90°$.

Non-linear relationship (5) can be produced physically by a cam attached to body 78, said cam operatively engaging torque lever clamped to the end of torsion bar, thus regulating twist $\omega$ as required for exact balancing, which is the main idea of the invention.

The cam which produces the required relationship between $\gamma$ and $\omega$, for linear or non-linear torsion bars, can now be constructed. For every $\gamma$ the corresponding $\omega$ can be calculated from Eq. 4 or Eq. 5. Thus for a certain $\gamma$ the position of torque lever and thereby the position of the roller attached to its end are determined. For every $\gamma$ from 0 to 120° plotting the corresponding position of the roller (represented by a circle of the same diameter as the roller), on this side of body 78, turned by angle $\gamma$, where cam is to be mounted, we obtain a family of circles. All these circles must be tangent to the working face of balancing cam. Thus, the envelope of this family of circles is the sought cam curve.

It is apparent from Eq. 5 that if weight or dimensions of body 78 are changed so that value of the product $Wd$ changes, the relationship between $\gamma$ and $\omega$ is not affected if at the same time $l$ is changed accordingly to keep $k/Wdl$ constant. In other words, body 78 of different size and weight can be exactly balanced by the same cam, if working length of torsion bar 80 is adjusted accordingly.

Application of general theory to the balancing mechanism described

Balancing of said arm structure for rotation on said first axis is not effected by any change in the angle of tilt of board 2. Likewise, balancing of said board structure for rotation on the second axis is not affected by any changes in the position of arm structure. In other words, balancing for height and angle of tilt of board are independent from each other, and in either case the problem is reduced to that of the basic case represented by FIGURE 14. In balancing for tilt W is equal the weight of board structure and axis of rotation is said second axis. In balancing for height of board, W is equal the sum of weights of arm structure and of board structure and axis of rotation is said first axis.

As it was pointed out, the same cam can be used for exact balancing of axially pivoted bodies of various sizes and weights, the difference in size and weight being compensated for by increasing or reducing the stiffness of torsion bar. The shape of the balancing cam is influenced by geometrical parameters, though, such as the distance of torsion bar from the axis of rotation, the working length of torque lever and the diameter of roller on the end of torque lever. By choosing these geometrical parameters equal for balancing height and angle of tilt it is possible to make cams 39 and 47 identical, just as it was done in the balancing mechanism described. For some values of said geometrical parameters a cam which will produce exact balancing does not exist. For relative values of parameters as can be scaled from FIGURE 11 and FIGURE 12, the cam to produce exact balancing does exist and it looks approximately as shown.

General remarks

In the basic case represented on FIGURE 14 the balancing cam can be clamped to the free end of torsion bar 80 and torque lever attached to the body 78 instead. The explained method of construction of the cam for exact balancing applies equally well to this case. The balancing cam is not limited to use with torsion bars. Coil springs can be used equally well. In this case the torque lever is rotatably attached to fixed body 79, FIGURE 14. Coil spring is attached to one end to fixed body 79 and on the other end to a point on said torque lever. The explained method of construction of balancing cam remains the same. Alternatively, a coil spring can be used in association with a cam but without a lever to balance the rotatable body 78, schematically shown on FIGURE 14, in the following manner: One end of the coil spring is anchored to the fixed body 79, a flexible, non-stretchable cable being connected at its one end to the movable end of said coil spring, and the other being connected to a point on the perimeter of a disc cam attached to body 78. When the body 78 is rotated about axis O so as to lower its centre of gravity, the cable is being wound upon the perimeter of the said cam, the points on perimeter of said cam being at varying distances from the said axis of rotation O to regulate the degree of tensioning of the coil spring so as to achieve exact balancing of the body 78 for every $\gamma$. Exactly the same effect can be achieved by attaching the said cam to fixed body 79 and connecting it by a cable to a coil spring anchored to the rotatable body 78.

In any of the above methods of using a spring in association with a cam for balancing a rotatable body, exact balancing can be achieved for every $\gamma$ for one value of $Wd$. For other values of $Wd$, balancing can also be made exact for all values of $\gamma$, provided the spring employed has a linear characteristic, and for at least two different values of $\gamma$, if the spring used has a non-linear characteristic. In the latter case a good approximation to exact balancing is obtained for the remaining values of $\gamma$.

The use of balancing cam and co-acting lever with a spring is not limited to balancing mechanism for drafting board. It can be used for balancing machine parts, excavators, crane booms, swing bridges, etc., heavy applications made possible by the availability of liquid springs.

Since various modifications can be made to the novel subject matter herein, without departing from the inventive concept which the same embodies, it is not intended that protection of this invention Letters Patent should be interpreted as restricted to the particular modification or modifications thereof particularly described and exemplified.

What I claim as my invention is:

1. A balancing mechanism consisting, in combination, essentially of a base structure, an arm structure, and a movable body, said arm structure being rotatably connected at its one end about a first axis to said base structure and at its other end rotatably connected about a second axis to said body, said first axis being parallel to said second axis, said arm structure supporting said body at a variable height and variable angles of inclination, said balancing mechanism including also a first and second spring means, a first co-acting means connected to the one operative end of said first spring means for balancing said arm structure and said body for rotation about first axis, a second co-acting means connected to the one operative end of said second spring means for balancing said body for rotation about said second axis, at least one of said co-acting means comprising essentially lever means and cam means having a non-circular working surface operatively engaged therewith.

2. The balancing mechanism according to claim 1 in which the working surface of said cam means is determined by the characteristics of the associated spring means for effecting the exact balance of said body at any height and angle of inclination within predetermined limits, and which includes means for adjusting said mechanism for subsequent variations in weight to be balanced, said means for adjusting co-operating with said spring means for effecting practically complete balancing of said body at any said height and angle of inclination, after the initial weight, for which said mechanism has been set to balance, has been changed.

3. The balancing mechanism according to claim 1 which includes additional means for locking said body at any desired height and angle of inclination within said predetermined limits.

4. The balancing mechanism according to claim 3 which includes a follower for said balanced body, rotatably connected to said base structure and to said arm structure about said first axis, and also includes coupling means for connecting said follower to said body so that rotation of said body around said second axis causes rotation of said follower around said first axis and vice-versa, said first spring means anchored at their one operative end to said base structure, said first co-acting means operatively interposed between the other end of said first spring means and said base structure, said second spring means anchored at their one operative end to said base structure, said second co-acting means operatively interposed between the other end of said second spring means and said follower.

5. The balancing mechanism according to claim 4 in which first co-acting means comprise essentially first lever mean asnd first cam means and second co-acting means comprise essentially second lever means and second cam means, in which said first axis is horizontal and in which said first and second spring means are in the form of first and second laminated torsion bars disposed parallel to said first axis, said first lever attached to one end of said first torsion bar at right angle thereto, said first lever at its distal end operatively engaging said first cam means, said first cam means being attached to said arm structure, said second lever attached at right angle to said second torsion bar, the distal end of said second lever operatively engaging said second cam means, said second cam means being attached to said follower, said means for adjusting being capable of varying the points upon the lengths of said torsion bars at which they are anchored to said base structure, said follower being in the form of a first pulley concentric with first axis, said coupling means consisting of second pulley attached to said body concentric with said second axis and of cable means extending between said first and second pulleys.

6. The suspension and locking system according to claim 5 which includes a manually operated lever rotatably connected to said arm structure adjacent said body, said part of said arm structure being located between said first pulley and said part of said base structure, linkage means connecting said manually operated lever to said first pulley, said linkage means locking together said first pulley, said part of said arm structure and said part of said base structure when said manually operated lever is rotated in one direction and unlocking said two parts and first pulley to release said body when it is rotated in the opposite direction.

7. In a piece of drafting furniture, in combination, a desk, a balancing mechanism, a board supported on said balancing mechanism, said mechanism being mounted on said desk for maintaining said board at a variable height and angle of inclination, said mechanism including a base structure, said base structure being normally stationary when the position of said board is being adjusted, said piece of drafting furniture including track means, one part of said track means is secured to the desk, the remaining mating part of said track means secured to said base structure, said track means allowing horizontal movement of base structure with respect to said desk, and means for locking said base structure to said desk.

8. A balancing mechanism according to claim 1, wherein said arm structure includes at least one arm extending between said first and second axes, the longitudinal axis of said arm being at approximately right angles to both said first and second axes, said arm being approximately U-shaped in transverse cross-section to accommodate parts of said balancing mechanism therewithin.

9. A suspension and locking system for a movable and balanced body, comprising in combination with said body a base structure and an arm structure, said arm structure at one end thereof being rotatably connected about a first axis of rotation to said base structure, the distal end of said arm structure being rotatably connected about a second axis of rotation to said body, said second axis being parallel to said first axis, a board follower rotatable about said first axis, said board follower rotatable about said first axis, said board follower coupled to said board for rotation of said board and said base structure in unison, a locking portion of said arm structure, a locking portion of said board follower and a locking portion of said base structure being located adjacent one another and capable of limited relative movement parallel to said first axis and locking means to effectively lock together said locking portions of said arm structure, said board follower and said base structure, said locking means comprising a push-pull rod and threaded part means connected thereto, said rod being movable parallel to said first axis, said threaded part being rotatable about said first axis, and a hand lever near said board operatively connected to said threaded part.

References Cited by the Examiner

UNITED STATES PATENTS

| | | | |
|---|---|---|---|
| 1,925,087 | 9/1933 | Andren | 108—2 |
| 1,956,546 | 4/1934 | Froelich | 108—2 |
| 2,988,843 | 6/1961 | Knudsen | 108—2 |
| 3,078,613 | 2/1963 | Morcheles | 108—2 |
| 3,089,275 | 5/1963 | Alabor | 108—2 |
| 3,131,654 | 5/1964 | May et al. | 108—2 |
| 3,140,559 | 7/1964 | Grow et al. | 108—8 XR |

FRANK B. SHERRY, *Primary Examiner.*

G. O. FINCH, *Assistant Examiner.*